(12) United States Patent
Chen (10) Patent No.: US 6,999,527 B2
(45) Date of Patent: Feb. 14, 2006

(54) PHASE DEMODULATOR, SYMBOL TIMING RECOVERY CIRCUIT AND THE METHOD THEREOF

(75) Inventor: Shih-Heng Chen, Taoyuan (TW)

(73) Assignee: Syncomm Technology Corporation, Taoyuan (TW)

( * ) Notice: Subject to any disclaimer, the term of this patent is extended or adjusted under 35 U.S.C. 154(b) by 849 days.

(21) Appl. No.: 09/982,823

(22) Filed: Oct. 22, 2001

(65) Prior Publication Data

US 2003/0031274 A1 Feb. 13, 2003

(30) Foreign Application Priority Data

Jul. 17, 2001 (TW) .............................. 90117485 A (51) Int. Cl.
  *H04L 27/14* (2006.01)
  *H04L 27/06* (2006.01)

(52) U.S. Cl. .................................................... 375/324

(58) Field of Classification Search ................ 375/324, 375/343, 350, 130, 316; 329/304, 311, 313
See application file for complete search history.

(56) References Cited

U.S. PATENT DOCUMENTS

| | | | | |
|---|---|---|---|---|
| 4,941,155 A | * | 7/1990 | Chuang et al. | ............. 375/330 |
| 5,276,706 A | * | 1/1994 | Critchlow | .................... 375/343 |
| 6,566,941 B1 | * | 5/2003 | Guo | ........................... 329/304 |
| 6,597,733 B1 | * | 7/2003 | Pollmann et al. | ........... 375/222 |
| 6,693,590 B1 | * | 2/2004 | Toplicar et al. | ............. 342/383 |
| 6,873,666 B1 | * | 3/2005 | Chen | ........................... 375/343 |

* cited by examiner

*Primary Examiner*—Khai Tran
(74) *Attorney, Agent, or Firm*—Birch, Stewart, Kolasch & Birch, LLP (57) ABSTRACT

This specification discloses a symbol timing recovery circuit, which includes a transform value generation circuit, a selection circuit, a plurality of accumulators, and a comparison module. Without performing phase difference calculation, the invention is a symbol timing recovery circuit that can directly use digital in-phase signal components and digital quadrature signal components of consecutive two symbols to obtain an optimal sampling point. The invention also provides a phase demodulator with a simple structure.

26 Claims, 4 Drawing Sheets

PHASE DEMODULATOR, SYMBOL TIMING RECOVERY CIRCUIT AND THE METHOD THEREOF

BACKGROUND OF THE INVENTION

1. Field of Invention

The invention relates to a phase demodulator, a symbol timing recovery circuit and the method thereof. More particularly, it relates to a phase demodulator, a symbol timing recovery circuit and the method thereof in a TDMA system using the π/4-DQPSK base frequency modulation technology.

2. Related Art

Figure 1:
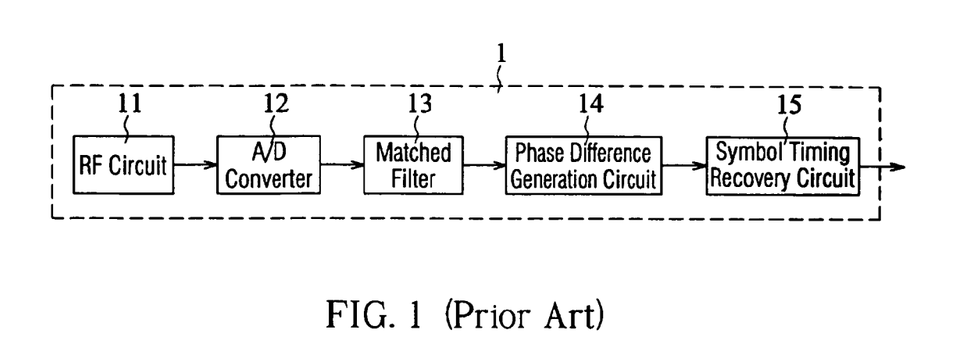
FIG. 1 is a block diagram of the circuit in a conventional phase demodulator.

In digital radio baseband modulation technologies, the π/4-DQPSK baseband modulation technology is a common technique. It is widely used in the USDC and PACS systems in North America and the PDC and PHS systems in Japan. In addition, the π/4-DQPSK baseband modulation technology is usually performed using a phase demodulator. A conventional phase demodulator 1 is shown in FIG. 1. It has a symbol timing recovery circuit 15. As shown in the drawing, the phase demodulator 1 further includes a radio frequency (RF) circuit 11, an analog-to-digital (A/D) converter 12, a matched filter 13, and a phase difference generation circuit 14.

The RF circuit 11 receives an analog high-frequency signal and converts it into an analog intermediate-frequency signal. The analog intermediate-frequency signal is then converted by the A/D converter 12 and filtered by the matched filter 13 to produce an in-phase signal I and a quadrature signal Q. In general, the in-phase signal I and the quadrature signal Q are signed digital signals. The phase difference generation circuit 14 uses the in-phase signal I and the quadrature signal Q to obtain a phase difference Δθ. The symbol timing recovery circuit 15 then performs the symbol timing recovery using the phase difference output from the phase difference generation circuit 14.

As described before, the conventional symbol timing recovery circuit 15 computes an optimal sampling point of a symbol. Usually, the phase difference generation circuit 14 is used to obtain a phase difference Δθ for the symbol timing recovery circuit 15. The symbol timing recovery circuit 15 then uses the phase difference Δθ to compute an optimal sampling point and thereby recover the symbol timing. Such techniques can be seen in the U.S. Pat. No. 4,941,155. However, the drawback in that patent is that when obtaining the optimal sampling point, several mathematical conversion operations have to be done between a polar coordinate system and the I-Q orthogonal coordinate system. This will results in long execution time.

In light of the foregoing drawbacks, how to simplify operations in obtaining the optimal sampling point while at the same time shortening the operation time is an important subject. Moreover, how to simplify the optimal sampling point operation and the required circuit to simplify the phase demodulator is also an important issue under study.

SUMMARY OF THE INVENTION

An object of the invention is to provide a symbol timing recovery circuit and the method thereof that can simplify the operation of obtaining an optimal sampling point and shortening the operation time.

Another object of the invention is to provide a phase demodulator that can simplify the operation of obtaining an optimal sampling point and thus simplify the required circuit.

One feature of the invention is to provide a symbol timing recovery circuit and the method thereof that does not need to perform any phase difference Δθ calculation while is able to obtain an optimal sampling point using the digital in-phase signal components and the digital quadrature signal components of any two consecutive symbols.

Another feature of the invention is to provide a phase demodulator that does not need to perform any phase difference Δθ calculation while is able to obtain an optimal sampling point using the digital in-phase signal components and the digital quadrature signal components of any two consecutive symbols.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

Symbol Timing Recovery Method

The disclosed symbol timing recovery method can recover symbol timing generated using the π/4-DQPSK modulation technology without the need to compute the phase and phase difference of a signal waveform. More specifically, the disclosed method directly uses digital in-phase signal components and digital quadrature signal components of any two consecutive symbols to find a best or optimal sampling point in a symbol cycle. The optimal sampling point is then used to perform symbol timing recovery.

Before detailed explanation of the disclosed method, it should be mentioned that in the embodiment used before each burst signal contains M symbols and each symbol contains N sampling points, where M and N are positive integers. Furthermore, I[kN+i] and Q[kN+i] (hereinafter referred to as I[n] and Q[n]) represent the corresponding digital in-phase signal component and digital quadrature signal component of a sampling point of certain symbol, respectively, where i and k are integers and $0 \leq k \leq M-1$ and $1 < i \leq N$. On the other hand, $I[(kN+i)-N]$ and $Q[(kN+i)-N]$ are the corresponding digital in-phase signal component and digital quadrature signal component of a sampling point of the symbol before a symbol. They are denoted by $I_d[n]$ and $Q_d[n]$, respectively, where i and k are integers, $0 \leq k \leq M-1$ and $1 < i \leq N$. For the same sampling point of any two consecutive symbols, the corresponding digital in-phase signal component and digital quadrature signal component of a sampling point of the previous symbol can also be expressed as $I[n-N]$ and $Q[n-N]$, respectively; that is, $I_d[n]=I[n-N]$ and $Q_d[n]=Q[n-N]$.

Figure 2:
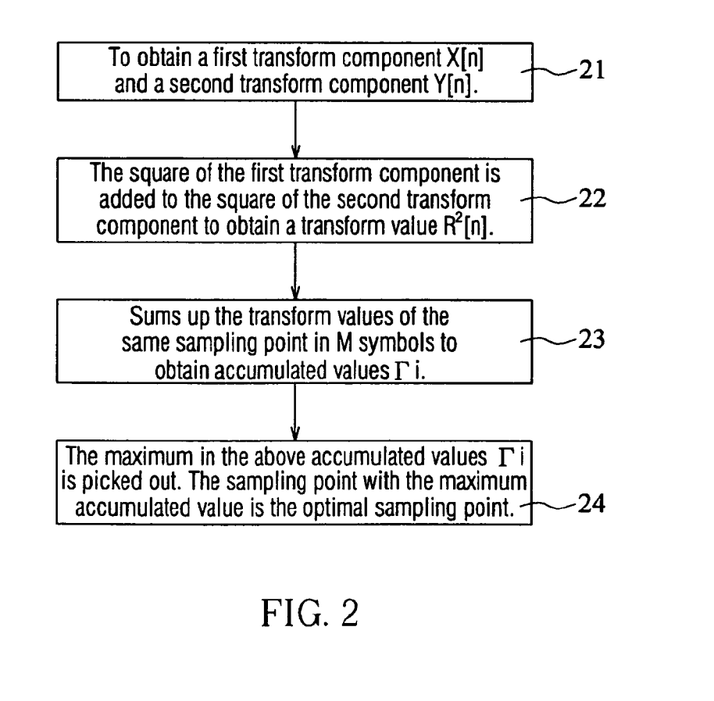
FIG. 2 is a block diagram showing the procedure of the disclosed symbol timing recovery method.

As shown in FIG. 2, step 21 combines the product of the in-phase signal components of any two consecutive symbols and the product of the quadrature signal components of the same two consecutive symbols to obtain a first transform component $X[n]$. A second transform component $Y[n]$ is obtained by taking the difference between the product of the in-phase signal component of the previous symbol and the quadrature signal component of the current symbol in any two consecutive symbols and the product of the in-phase signal component of the current symbol and the quadrature signal component of the previous symbol in the same two consecutive symbols. In terms of mathematical equations, one has $$X[n]=I[n]I_d[n]+Q[n]Q_d[n], \quad (1a)$$

$$Y[n]=I_d[n]Q[n]-I[n]Q_d[n]. \quad (1b)$$

In step 22, the square of the first transform component is added to the square of the second transform component to obtain a transform value $$R^2[n]=X^2[n]+Y^2[n]. \quad (1c)$$

Step 23 sums up the transform values of the same sampling point in M symbols to obtain accumulated values $$\Gamma_i = \sum_{n=kN+i} R^2[n],$$

,where i and k are integers, $0 \leq k \leq M-1$ and $1 < i \leq N$.

In step 24, the maximum in the above accumulated values $\Gamma_i$ is picked out. The sampling point with the maximum accumulated value is the optimal sampling point. Once the optimal sampling point is determined, timing can be adjusted accordingly so as to correctly perform symbol timing recovery.

The following texts explain why the maximum accumulated value can be used to determine the optimal sampling point.

As said before, since $I[n]$ and $Q[n]$ represent the in-phase signal component and the quadrature signal component, respectively, on the I-Q coordinate plane they can be expressed as $$I[n]=r \times \cos \theta_n, \quad (2a)$$

$$Q[n]=r \times \sin \theta_n, \quad (2b)$$

where $r^2=I^2+Q^2$. At the same time, $I_d[n]$ and $Q_d[n]$ are $$I_d[n]=I[n-N]=r \times \cos \theta_{n-N}, \quad (2c)$$

$$Q_d[n]=Q[n-N]=r \times \sin \theta_{n-N}. \quad (2d)$$

After inserting Eqs. (2a), (2b), (2c), and (2d) into Eqs. (1a) and (1b), one obtains $$X[n]=r^2 \cos \theta_n \cdot \cos \theta_{n-N} + r^2 \sin \theta_n \cdot \sin \theta_{n-N}, \quad (3a)$$

$$Y[n]=r^2 \sin \theta_n \cdot \cos \theta_{n-N} - r^2 \cos \theta_n \cdot \sin \theta_{n-N}. \quad (3b)$$

From trigonometry, Eqs. (3a) and (3b) can be re-expressed using $$\cos \theta_n \cdot \cos \theta_{n-N} + \sin \theta_n \cdot \sin \theta_{n-N} = \cos(\theta_n - \theta_{n-N}), \quad (4a)$$

$$\sin \theta_n \cdot \cos \theta_{n-N} - \cos \theta_n \cdot \sin \theta_{n-N} = \sin(\theta_n - \theta_{n-N}), \quad (4b)$$

as $$X[n]=r^2 \cos(\theta_n - \theta_{n-N}), \quad (5a)$$

$$Y[n]=r^2 \sin(\theta_n - \theta_{n-N}). \quad (5b)$$

Therefore, one sees from Eqs. (5a) and (5b) that calculations of $X[n]$ and $Y[n]$ are equivalent to computing the phase difference.

Figure 3:
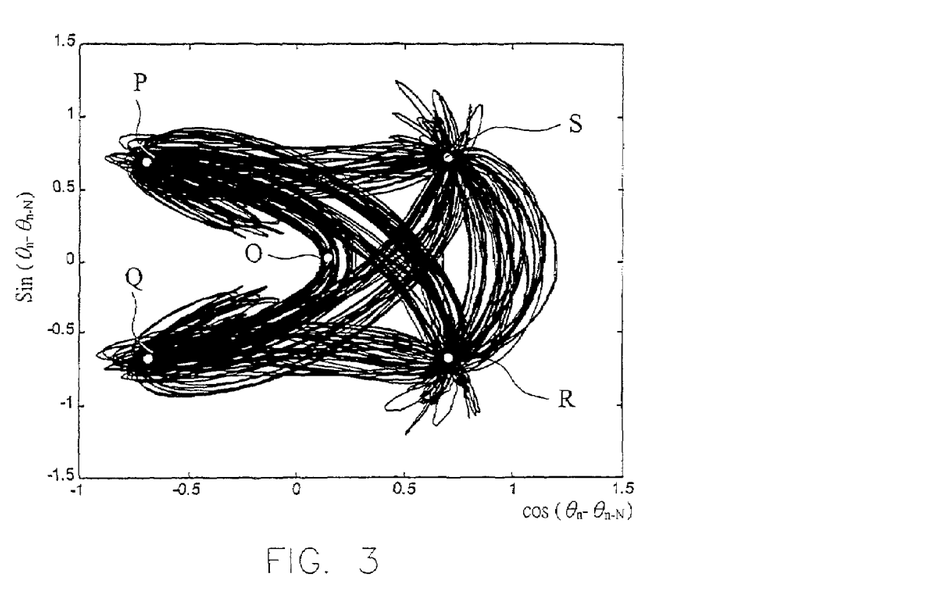
FIG. 3 is a simulated diagram of converting a plurality of burst signals into the X-Y plane, each burst signal containing 60 symbols (M=60) and each symbol containing 25 sampling points (N=25)

It should be noted that here $R^2[n]=r^4(r^2 \cos(\theta_n - \theta_{n-N}) + r^2 \sin(\theta_n - \theta_{n-N}))$ Thus, the value of $R^2[n]$ at any sampling point is not always 1, as shown in FIG. 3. When $R^2[n]=1$, it stands for the maximum average distance from the central point O to point P, point Q, point R, and point S. In other words, when the accumulated value reaches its maximum the sampling point is the optimal sampling point.

Symbol Timing Recovery Circuit

In the following, we use FIGS. 4 through 7 to explain the symbol timing recovery circuit of the invention.

Figure 4:
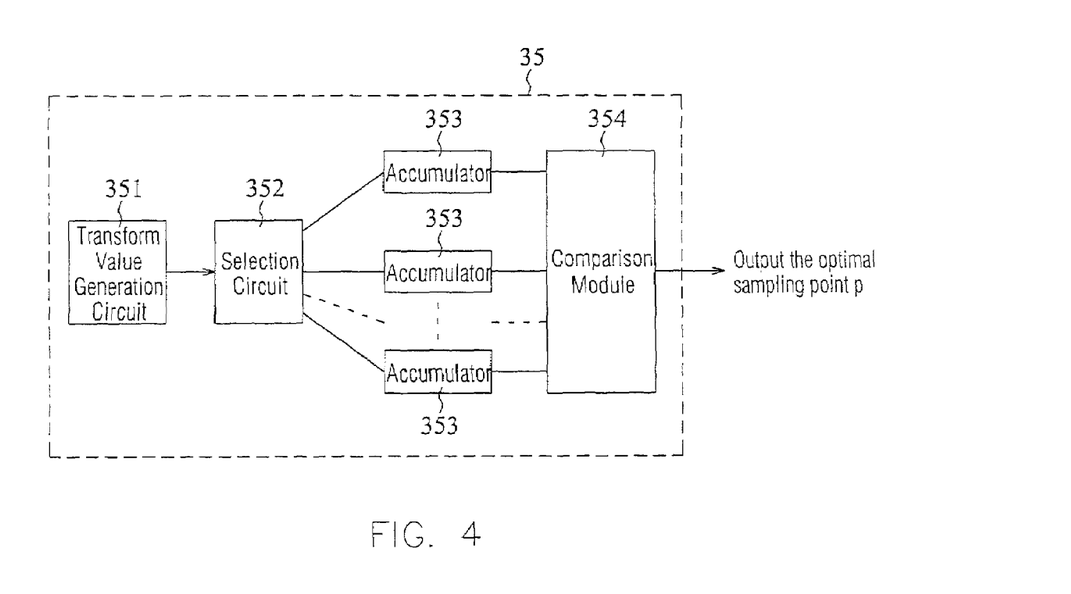
FIG. 4 is a block diagram showing the structure of a preferred symbol timing recovery circuit.
Figure 5:
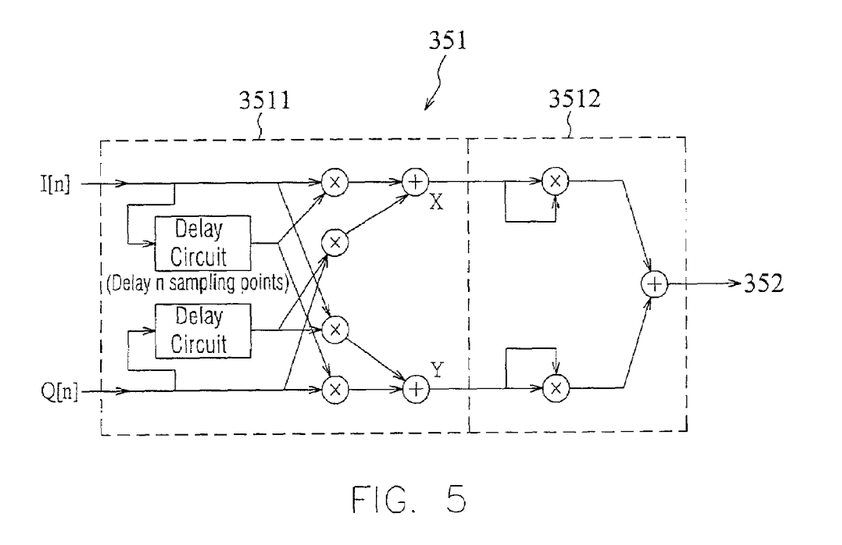
FIG. 5 shows a structure of the transform value generation circuit.

As shown in FIG. 4, the disclosed symbol timing recovery circuit 35 includes a transform value generation circuit 351, a selection circuit 352, several accumulators 353, and a comparison module 354. The transform value generation circuit 351 uses the in-phase signal components and the quadrature signal components of the same sampling point of any two consecutive symbols to generate a transform value $R^2[n]$ for the sampling point. With reference to FIG. 5, the transform value generation circuit 351 contains a first operation circuit 3511 and a second operation circuit 3512.

The first operation circuit 3511 is mainly composed of two delay circuits, four multipliers, and two adders. The first operation circuit 3511 uses the in-phase signal component $I[n]$ and the quadrature signal component $Q[n]$ to generate a first transform component $X[n]$ and a second transform component $Y[n]$. The first transform component $X[n]$ is equal to the sum of the product of the in-phase signal components of any two consecutive symbols and the product of the quadrature signal components of the same two consecutive symbols at the same sampling point. It is already expressed in Eq. (1a). The second transform component $Y[n]$ is equal to the difference between the product of the in-phase signal component of the previous symbol and the quadrature signal component of the current symbol in any two consecutive symbols and the product of the in-phase signal component of the current symbol and the quadrature signal component of the previous symbol in the same two consecutive symbols at the same sampling point. It is also expressed in Eq. (1b).

The second operation circuit 3512 is mainly composed of two multipliers and an adder. A transform value $R^2[n]$ is produced from the first transform component $X[n]$ and the second transform component $Y[n]$. Numerically, $R^2[n]$ is the sum of the squares of $X[n]$ and $Y[n]$, as expressed in Eq. (1c).

Moreover, the selection circuit 352 is electrically connected to the transform value generation circuit 351 to receive the transform value $R^2[n]$ output from the transform value generation circuit 351. The transform value $R^2[n]$ at each sampling point is output according to the order of the sampling point. In the current embodiment, the selection circuit 352 is a demultiplexer.

Each of the accumulators 353 receives the transform value of each sampling point output from the selection circuit 352. The number of the accumulators 353 is equal to the number of sampling points for each symbol. In the current embodiment, the number of sampling points for each symbol is 25, i.e. N=25. Each accumulator is used to accumulate the transform values of the same sampling point in any two consecutive symbols, obtaining the accumulated value $\Gamma_1$ corresponding to each sampling point.

Figure 6:
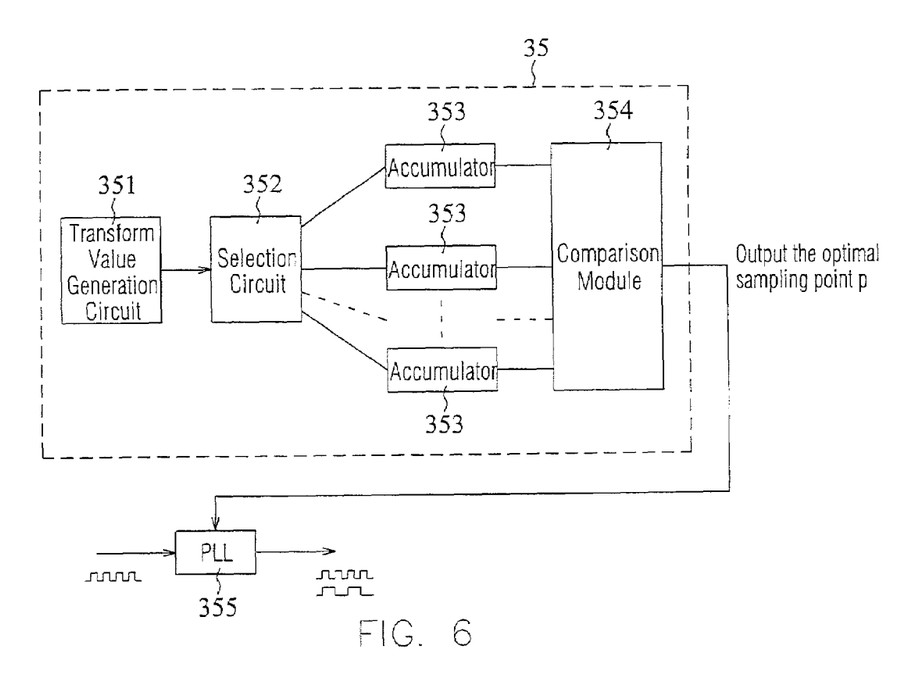
FIG. 6 is a block diagram of another symbol timing recovery circuit.

The comparison module 354 is electrically connected to the accumulators 353 to receive the accumulated valued output from the accumulators 353 and to compare them to obtain the maximum accumulated value. The sampling point with the maximum accumulated value is the optimal sampling point. As shown in FIG. 6, the optimal sampling point p output from the comparison module 354 is then used to determine which interval of a symbol the optimal sampling point is located, whereby controlling a phase lock loop (PLL) 355 to adjust the clock for correctly recovering the symbol timing of received signals. For example, in the given embodiment, the optimal sampling point is by default set at the $$\frac{N-1}{2}$$

sampling point of a symbol. When $$0 \leq p \leq \frac{N-1}{2},$$

namely the optimal sampling point p output from the comparison module 354 is in the first half section of the symbol, the clock output from the PLL 355 is adjusted to tick faster. Otherwise, if $$\frac{N-1}{2} < p \leq N,$$

the clock from the PLL 355 is adjusted to go slower.

Another embodiment of the symbol timing recovery circuit is given below. To simplify the description, the same element uses the same numerical from the previous embodiment and the associated explanation is omitted.

Figure 7:
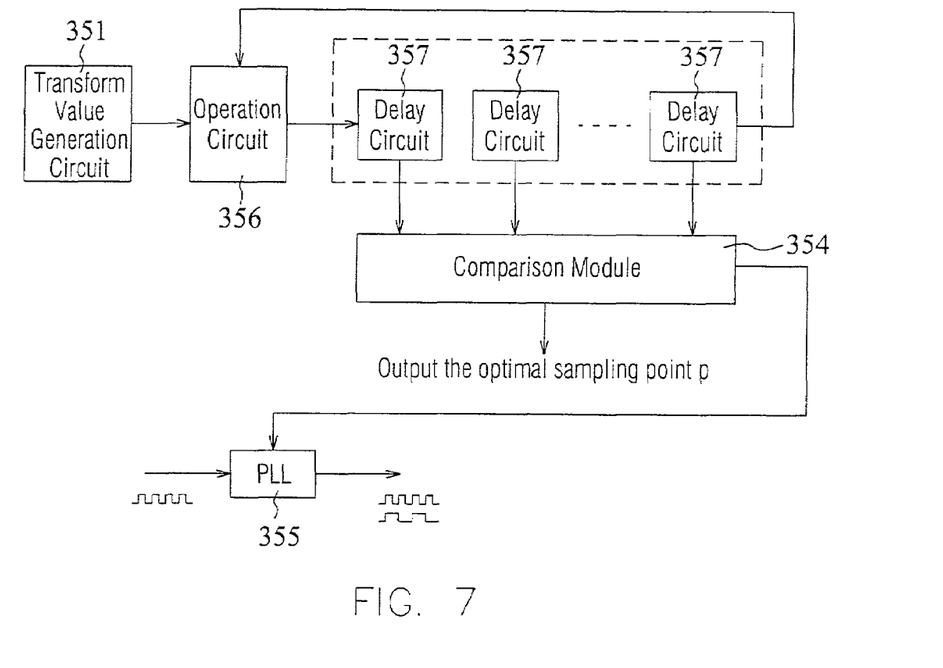
FIG. 7 is a block diagram of yet another symbol timing recovery circuit.

As shown in FIG. 7, the symbol timing recovery circuit 35 also includes a transform value generation circuit 351, an operation circuit 356, several delay circuits 357, and a comparison module 354.

Here the operation circuit 356 can be an adder to combine the transform values of consecutive symbols at the same sampling point.

The delay circuits 357 delay the output of the transform values. The number of the delay circuits 357 is equal to the number of sampling points in each symbol. Here the number of sampling points in each symbol is 25. The transform value of the first sampling point from the first delay circuit 357 is added at the corresponding time in each symbol cycle. Similarly, the transform value of the second sampling point from the second delay circuit 357 is added at the corresponding time (corresponds to the second sampling point) in each symbol cycle. When the total operation time for the accumulation is equal to 60 symbol cycles, each delay circuit 357 outputs the accumulated value of the transform values at each sampling point. The accumulated values are then compared in the comparison module 354 to obtain a maximum accumulated value. The sampling point with the maximum accumulated value is the optimal sampling point.

It should be mentioned that the comparison module 354 in FIG. 7 also outputs the location of the optimal sampling point. Analogous to the embodiment in FIG. 6, the interval which the optimal sampling point is located in a symbol is determined first so as to control a PLL 355 for adjusting the clock. The symbol timing of received signals can thus be correctly recovered.

From the above description, the disclosed symbol timing recovery circuit can directly use the in-phase signal component and the quadrature signal component to compute the optimal sampling point without performing many times of coordinate transformation computation between the polar coordinate system and the I-Q orthogonal coordinate system. It also does not involve complicated calculation of the phase difference $\Delta\theta$. Therefore, the time for searching the optimal sampling point can be greatly shortened.

Phase Demodulator

With the symbol timing recovery circuit and its method being explained before, the following gives a description of the phase demodulator of the invention.

Figure 8:
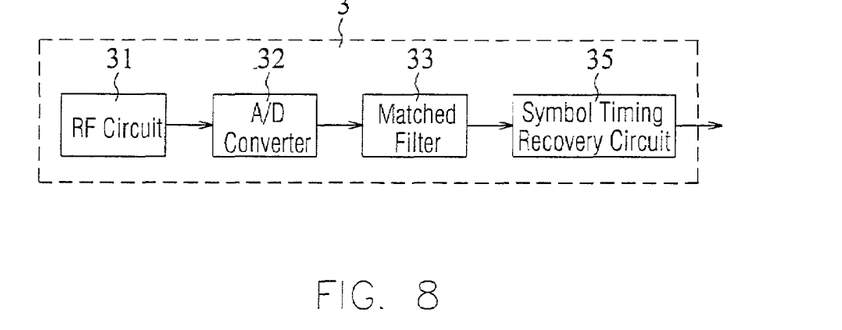
FIG. 8 shows a structure of the disclosed phase demodulator.

With reference to FIG. 8, the phase demodulator 3 of the invention includes an RF circuit 31, an A/D converter 32, a matched filter 33, and a symbol timing recovery circuit 35. Since the functions of the RF circuit 31, the A/D converter 32, and the matched filter 33 are the same as before, therefore their descriptions are omitted. Since the function of the symbol timing recovery circuit 35 is the same of the one disclosed hereinbefore, its explanation is also omitted.

From FIG. 8, one sees that in comparison with the conventional phase demodulator 1, the phase demodulator 3 of the invention has one less phase difference generation circuit 14. The main reason is that the symbol timing recovery circuit 35 of the disclosed phase demodulator 3 does not need to use the phase difference to go to the polar coordinate system for searching the optimal sampling point. It directly uses the in-phase signal component and the quadrature signal component output from the matched filter 33 to compute the optimal sampling point. Therefore, the disclosed phase demodulator 3 can has one less phase difference generation circuit. One thus sees that the invention can simplify the operation for obtaining the optimal sampling point and the corresponding circuit.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A symbol timing recovery circuit receiving in-phase signal components and quadrature signal components and searching and outputting an optimal sampling point in a symbol cycle using the phase signal components and the quadrature signal components, which circuit comprises:
- a transform value generation circuit, which uses the in-phase signal components and the quadrature signal components of the same sampling point in any two consecutive symbols to generate a transform value corresponding to the sampling point;
- a selection circuit, which is electrically coupled with the transform value generation circuit to receive the transform value output from the transform value generation circuit and to output the transform value according to the order of the sampling point;
- a plurality of accumulators, each of which receives the transform value of a corresponding sampling point output from the selection circuit, with the number of the accumulators being equal to the number of sampling points and each accumulator combines the transform values of the same sampling point in any two consecutive symbols, thus obtaining an accumulated value for each sampling point; and
- a comparison module, which is electrically coupled with the plurality of accumulators, receives the accumulated values output from the accumulators, and compares the accumulated value to obtain a maximum accumulated value;

wherein the sampling point with the maximum accumulated value is the optimal sampling point.

2. The circuit of claim 1, wherein the symbol timing recovery circuit further includes a phase lock loop (PLL), which uses the optimal sampling point output from the comparison module to adjust timing and to correctly recover the symbol timing.

3. The circuit of claim 1, wherein the transform value generation circuit includes a first operation circuit and a second operation circuit, the first operation circuit using the in-phase signal components and the quadrature signal components to generate a first transform component and a second transform component, and the second operation circuit using the first transform component and the second transform component to generate the transform value.

4. The circuit of claim 3, wherein the first transform component is equal to the sum of the product of the in-phase signal components of any two consecutive symbols and the product of the quadrature signal components of the same two consecutive symbols at the same sampling point, the second transform component is equal to the difference between the product of the in-phase signal component of a previous symbol and the quadrature signal component of a current symbol in any two consecutive symbols and the product of the in-phase signal component of the current symbol and the quadrature signal component of the previous symbol in the same two consecutive symbols at the same sampling point, and the transform value is equal to the sum of the square of the first transform component and the square of the second transform component.

5. The circuit of claim 1, wherein the selection circuit is a demultiplexer.

6. The circuit of claim 1, wherein each symbol cycle contains 25 sampling points and the sampling rate is 25 times the symbol rate.

7. A symbol timing recovery circuit receiving an in-phase signal components and a quadrature signal components and searching and outputting an optimal sampling point in a symbol cycle using the phase signal components and the quadrature signal components, which circuit comprises:
- a transform value generation circuit, which uses the in-phase signal components and the quadrature signal components of the same sampling point in any two consecutive symbols to generate a transform value corresponding to the sampling point;
- an operation circuit, which is electrically coupled with the transform value generation circuit to receive the transform value output from the transform value generation circuit, to add the transform value to another transform value and to output the sum;
- a plurality of delay circuits connected together in series with a first delay circuit and the last delay circuit electrically connected to the operation circuit, the transform value of each sampling point from the delay circuit being added at the corresponding time in each symbol cycle, and accumulated values by summing over the transform values of sampling points being output by the delay circuits respectively after a predetermined time; and
- a comparison module, which is electrically coupled with the plurality of delay circuits to receive the accumulated values output from the plurality of delay circuits, to compare the accumulated values for obtaining a maximum accumulated value;

wherein the sampling point with the maximum accumulated value is the optimal sampling point.

8. The circuit of claim 7 further comprising a PLL, which uses the optimal sampling point output from the comparison module to adjust timing and to correctly recover the symbol timing.

9. The circuit of claim 7, wherein the transform value generation circuit includes a first operation circuit and a second operation circuit, the first operation circuit using the in-phase signal components and the quadrature signal components to generate a first transform component and a second transform component, and the second operation circuit using the first transform component and the second transform component to generate the transform value.

10. The circuit of claim 9, wherein the first transform component is equal to the sum of the product of the in-phase signal components of any two consecutive symbols and the product of the quadrature signal components of the same two consecutive symbols at the same sampling point, the second transform component is equal to the difference between the product of the in-phase signal component of a previous symbol and the quadrature signal component of a current symbol in any two consecutive symbols and the product of the in-phase signal component of the current symbol and the quadrature signal component of the previous symbol in the same two consecutive symbols at the same sampling point, and the transform value is equal to the sum of the square of the first transform component and the square of the second transform component.

11. The circuit of claim 7, wherein the operation circuit is an adder.

12. The circuit of claim 7, wherein each symbol cycle contains 25 sampling points and the sampling rate is 25 times the symbol rate.

13. A symbol timing recovery method for finding an optimal sampling point in a symbol cycle from in-phase signal components and quadrature signal components of any two consecutive symbols, comprising the steps of:
- for the same sampling point, summing the product of the in-phase signal components of any two consecutive symbols and the product of the quadrature signal components of the same two consecutive symbols to obtain a first transform component, taking the difference between the product of the in-phase signal component of a previous symbol and the quadrature signal component of a current symbol in any two consecutive symbols and the product of the in-phase signal component of the current symbol and the quadrature signal component of the previous symbol in the same two consecutive symbols to obtain a second transform component;

summing the square of the first transform component and the square of the second transform component to obtain a transform value;

summing the transform values at each sampling point from a plurality of consecutive symbols to obtain accumulated values; and comparing the accumulated values corresponding to each sampling point to obtain a maximum;

wherein the sampling point with the maximum accumulated value is the optimal sampling point.

14. The method of claim 13, wherein each symbol cycle contains 25 sampling points and the sampling rate is 25 times the symbol rate.

15. A phase demodulator, which comprises:

a radio frequency (RF) circuit, which receives an analog high-frequency signal and converts it into an analog intermediate-frequency signal;

an analog-to-digital (A/D) converter, which is electrically coupled with the RF circuit to receive the analog intermediate-frequency signal and to convert it into a digital signal;

a matched filter, which is electrically coupled with the A/D converter and generates an in-phases signal and a quadrature signal according to the digital signal; and a symbol timing recovery circuit, which is electrically coupled with the matched filter and obtains an optimal sampling point according to the in-phase signal and the quadrature signal;

wherein the symbol timing recovery circuit comprises:

a transform value generation circuit, which uses the in-phase signal components and the quadrature signal components of the same sampling point in any two consecutive symbols to generate a transform value corresponding to the sampling point;

a selection circuit, which is electrically coupled with the transform value generation circuit to receive the transform value output from the transform value generation circuit and to output the transform value according to the order of the sampling point;

a plurality of accumulators, each of which receives the transform value of a corresponding sampling point output from the selection circuit, with the number of the accumulators being equal to the number of sampling points and each accumulator combines the transform values of the same sampling point in any two consecutive symbols, thus obtaining an accumulated value for each sampling point; and a comparison module, which is electrically coupled with the plurality of accumulators, receives the accumulated values output from the accumulators, and compares the accumulated value to obtain a maximum accumulated value;

wherein the sampling point with the maximum accumulated value is the optimal sampling point.

16. The phase demodulator of claim 15, wherein the symbol timing recovery circuit further includes a PLL, which uses the optimal sampling point output from the comparison module to adjust timing and to correctly recover the symbol timing.

17. The phase demodulator of claim 15, wherein the transform value generation circuit includes a first operation circuit and a second operation circuit, the first operation circuit using the in-phase signal components and the quadrature signal components to generate a first transform component and a second transform component, and the second operation circuit using the first transform component and the second transform component to generate the transform value.

18. The phase demodulator of claim 17, wherein the first transform component is equal to the sum of the product of the in-phase signal components of any two consecutive symbols and the product of the quadrature signal components of the same two consecutive symbols at the same sampling point, the second transform component is equal to the difference between the product of the in-phase signal component of a previous symbol and the quadrature signal component of a current symbol in any two consecutive symbols and the product of the in-phase signal component of the current symbol and the quadrature signal component of the previous symbol in the same two consecutive symbols at the same sampling point, and the transform value is equal to the sum of the square of the first transform component and the square of the second transform component.

19. The phase demodulator of claim 15, wherein the selection circuit is a demultiplexer.

20. The phase demodulator of claim 15, wherein each symbol cycle contains 25 sampling points and the sampling rate is 25 times the symbol rate.

21. A phase demodulator, which comprises:

a radio frequency (RF) circuit, which receives an analog high-frequency signal and converts it into an analog intermediate-frequency signal;

an analog-to-digital (A/D) converter, which is electrically coupled with the RF circuit to receive the analog intermediate-frequency signal and to convert it into a digital signal;

a matched filter, which is electrically coupled with the A/D converter and generates an in-phases signal and a quadrature signal according to the digital signal; and a symbol timing recovery circuit, which is electrically coupled with the matched filter and obtains an optimal sampling point according to the in-phase signal and the quadrature signal;

wherein the symbol timing recovery circuit comprises:

a transform value generation circuit, which uses the in-phase signal components and the quadrature signal components of the same sampling point in any two consecutive symbols to generate a transform value corresponding to the sampling point;

an operation circuit, which is electrically coupled with the transform value generation circuit to receive the transform value output from the transform value generation circuit, to add the transform value to another transform value and to output the sum;

a plurality of delay circuits connected together in series with a first delay circuit and the last delay circuit electrically connected to the operation circuit, the transform value of each sampling point from the delay circuit being added at the corresponding time in each symbol cycle, and accumulated values by summing over the transform values of sampling points being output by the delay circuits respectively after a predetermined time; and a comparison module, which is electrically coupled with the plurality of delay circuits to receive the accumulated values output from the plurality of delay circuits, to compare the accumulated values for obtaining a maximum accumulated value;

wherein the sampling point with the maximum accumulated value is the optimal sampling point.

22. The phase demodulator of claim 21 further comprising a PLL, which uses the optimal sampling point output from the comparison module to adjust timing and to correctly recover the symbol timing.

23. The phase demodulator of claim 21, wherein the transform value generation circuit includes a first operation circuit and a second operation circuit, the first operation circuit using the in-phase signal components and the quadrature signal components to generate a first transform component and a second transform component, and the second operation circuit using the first transform component and the second transform component to generate the transform value.

24. The phase demodulator of claim 23, wherein the first transform component is equal to the sum of the product of the in-phase signal components of any two consecutive symbols and the product of the quadrature signal components of the same two consecutive symbols at the same sampling point, the second transform component is equal to the difference between the product of the in-phase signal component of a previous symbol and the quadrature signal component of a current symbol in any two consecutive symbols and the product of the in-phase signal component of the current symbol and the quadrature signal component of the previous symbol in the same two consecutive symbols at the same sampling point, and the transform value is equal to the sum of the square of the first transform component and the square of the second transform component.

25. The phase demodulator of claim 21, wherein the operation circuit is an adder.

26. The phase demodulator of claim 21, wherein each symbol cycle contains 25 sampling points and the sampling rate is 25 times the symbol rate.

* * * * *